Inventor.
Pilade Barducci.
By his Attorney

P. BARDUCCI.
DRYING PLANT.
APPLICATION FILED AUG. 16, 1919.
1,381,054.
Patented June 7, 1921.
6 SHEETS—SHEET 3.
Fig. 13
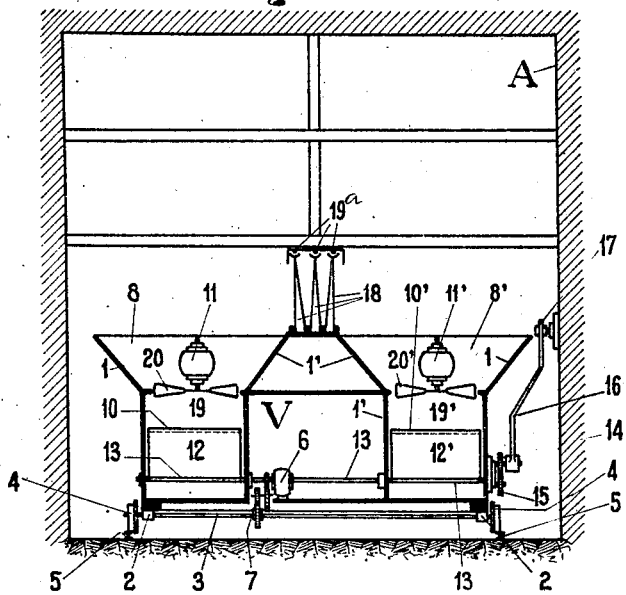
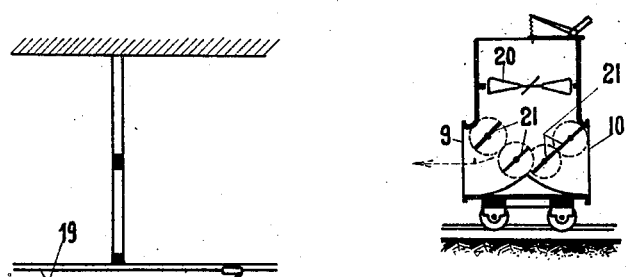
Fig. 15
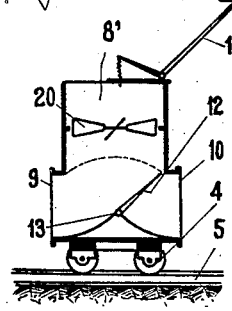
Fig. 14
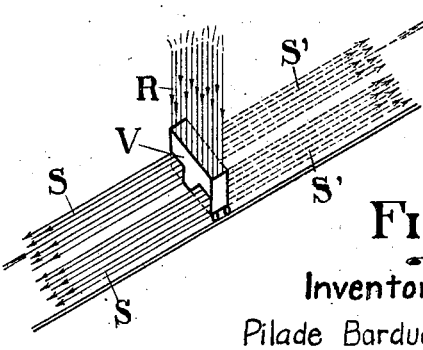
Fig. 16
Inventor.
Pilade Barducci.
By Laurence Launquer
Attorney.

Inventor,
Pilade Barducci

P. BARDUCCI.
DRYING PLANT.
APPLICATION FILED AUG. 16, 1919.

1,381,054.

Patented June 7, 1921.
6 SHEETS—SHEET 5.

Inventor.
Pilade Barducci.
By Lawrence Langner
Attorney.

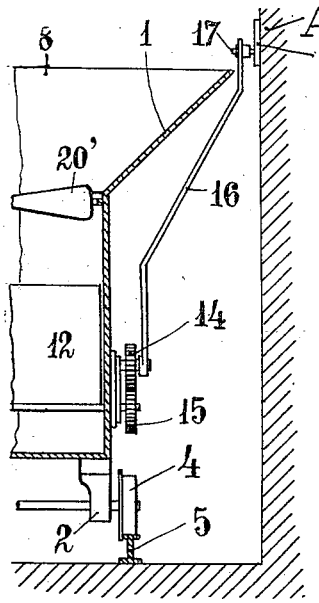
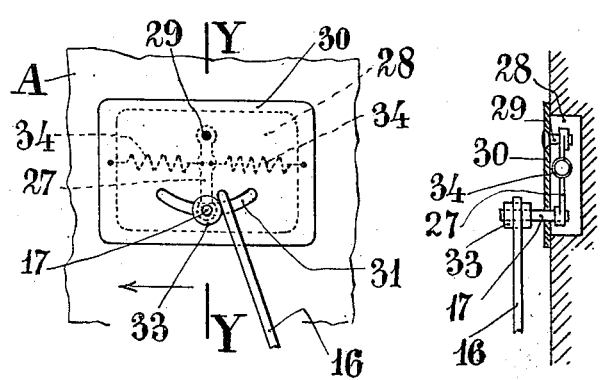
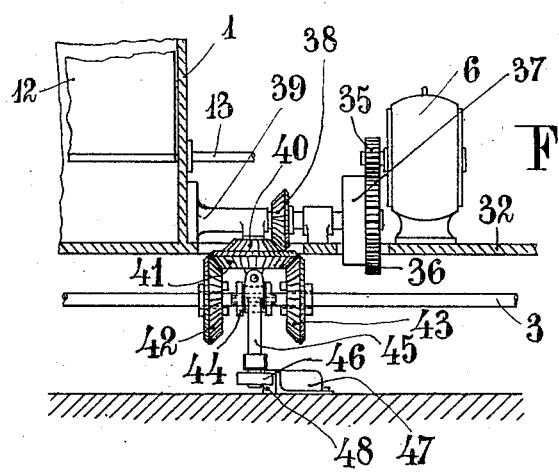

UNITED STATES PATENT OFFICE.

PILADE BARDUCCI, OF NAPLES, ITALY.

DRYING PLANT.

1,381,054.  Specification of Letters Patent.  Patented June 7, 1921.

Application filed August 16, 1919. Serial No. 317,900.

*To all whom it may concern:*

Be it known that I, PILADE BARDUCCI, a subject of the King of Italy, and resident of Naples, Italy, have invented certain new and useful Improvements in Drying Plants, of which the following is a specification.

This invention relates to ventilating apparatus for drying rooms and has for its object an apparatus particularly useful in drying rooms having a great length when compared with their width. Said apparatus comprises, according to this invention, means traveling in the room and producing in succession in the different portions of said room a vertical air current and a plurality of air streams directed along the path of said means and longitudinally in the room; these streams cause the air to be moved vertically at a distance from the zone in which said vertical current is produced and may be inclined or horizontal ones and in this latter case, if required, they may take place near either of the horizontal walls of the room.

The above mentioned plant produces an alternating ventilation and is particularly useful when the material to be dried is adapted to be hung in the intermediate portion of the room, as in the case of long alimentary pastes or macaroni, wool or cotton threads, tobacco leaves or the like.

This invention also comprises means for producing the above described operation, these means operating to give rise to the air current and streams referred to and being also adapted to coöperate with inlet and exhaust ports provided in the walls of the drying room and intended to supply air into and remove it from said room for the purpose of changing the circulating air.

The annexed drawings show diagrammatically the operation of the plant and some constructions of the air moving means according to this invention.

In said drawings,

Fig. 13 is a transverse section of a room on an enlarged scale showing in detail the ventilating device;

Fig. 14 is a partial longitudinal section of the room and ventilating device;

Fig. 15 is a longitudinal section of a modified construction of ventilating device;

Fig. 16 is a diagram showing the operation of this ventilating device;

Fig. 23 is a fragmentary transverse section of a drying room on an enlarged scale showing a construction of means for reversing the operation of the ventilating means at each stroke;

Fig. 24 is a front view showing a detail of said means;

Fig. 25 is a transverse fragmentary section on line $y$—$y$ of Fig. 24, and Fig. 26 is a fragmentary detail section of a device for reversing the running of said ventilating means.

As shown by Figs. 1 to 6, the chamber A has preferably a great length with regard to its width and is adapted to contain the material to be dried which is located in the zone P of said chamber. A ventilating device V is arranged to reciprocate throughout said room and along said material, and this device operates as hereinafter described to produce a suction from the top to the bottom of the room as well as one or more horizontal air streams directed lengthwise in the room in proximity to the floor; said streams have a given direction when the ventilating device V, during its reciprocation, is in one section of the room and the opposite direction when said ventilating device is in the other section of the room, said sections being shown by references X and Z.

Figure 1:
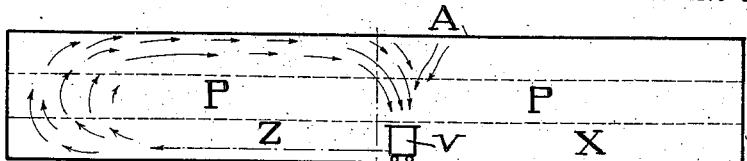
Figures 1 to 6 show diagramatically the paths of air streams obtained in a drying room according to this invention.
Figure 2:
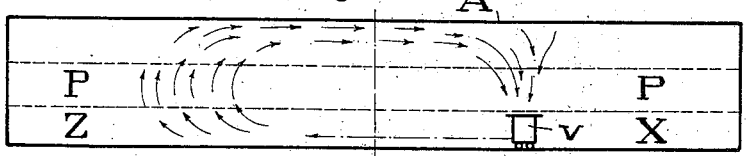
Figure 3:
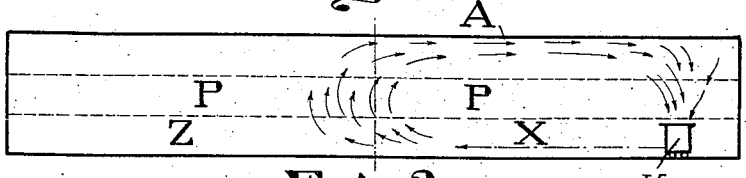

Obviously, when said horizontal streams have a length equal to about one half of the length of room A, this being obtained by imparting a proper speed to the air current at its issue from the device V, and they are caused to act in section Z of room A when the device V travels in the other section X, the material located in portion P of section Z is ventilated from bottom to top and at the same time the material located in section X is ventilated from top to bottom. This is shown by Figs. 1, 2 and 3 in which the device V is shown in three different positions along its path in section X of room A.

Figure 4:
Figure 5:
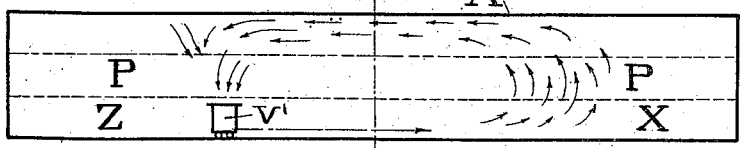
Figure 6:
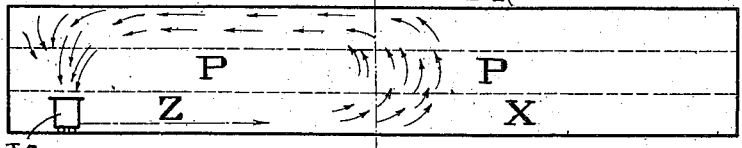

On the contrary, when the device V travels in section Z, the material located in section Z is ventilated from top to bottom and the material located in section X is ventilated from bottom to top, this being shown by Figs. 4, 5 and 6 showing three positions of said device V in section Z of chamber A.

This operation is obtained by reversing the direction of the horizontal air stream or streams on said device V reaching the middle of room A, in the manner hereinafter described.

The efficiency of the air circulation produced by the described device may be further increased by a proper coöperation with the ports intended to supply the air to and remove it from said room; for this purpose said ports are arranged at the ends of the room and are controlled in such a way that the longitudinal air streams produced in the room by the device V meet the air streams entering the room through said ports.

Such a construction is shown by Figs. 7 to 12 in which at the ends of room A are provided ports M and N with fans F, these ports and fans being preferably located near the floor of the room. Said fans are operated by reversible means for the purpose of reversing the direction of air streams produced thereby and of directing them against the longitudinal air stream issuing from the ventilating device V.

Instead of causing the ventilating device to travel at each stroke throughout the room and of reversing the direction of the air stream issuing from the ventilating device and the operation of fans F at each stroke, said ventilating device may be caused to reciprocate for a given time in a single section of the room, and then it may be caused to pass into another section of said room and to reciprocate for a given time in this section, the direction of said air stream and the operation of the fans F being reversed at the moment in which said ventilating device is passing from the first section to the second one of the room A, as hereinafter described.

Figure 7:
Figs. 7 to 12 show the paths of air streams in a construction in which the air moving means coöperate with air inlet and exhaust ports provided in the room walls.
Figure 8:
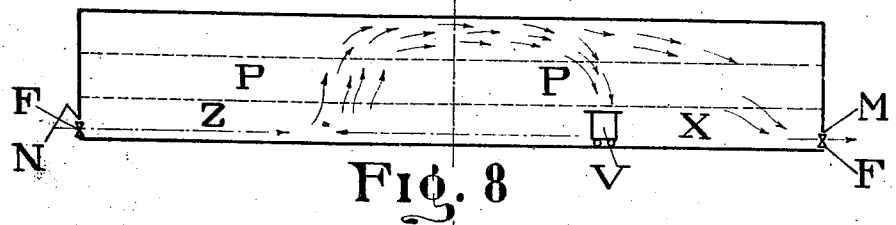
Figure 9:
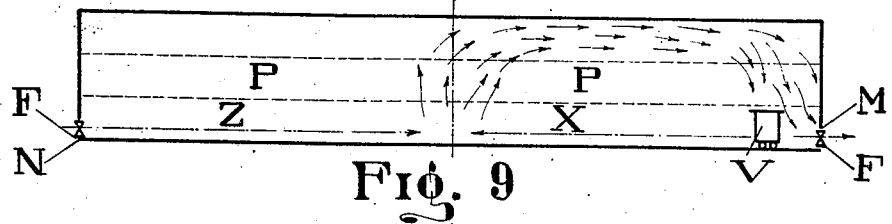
Figure 10:
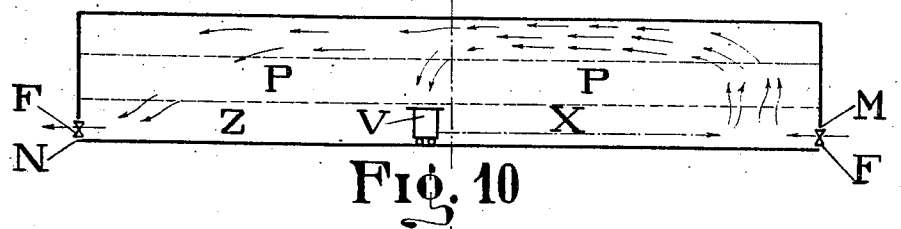
Figure 11:
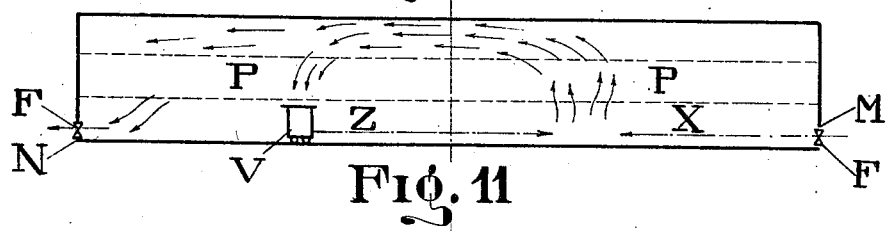
Figure 12:
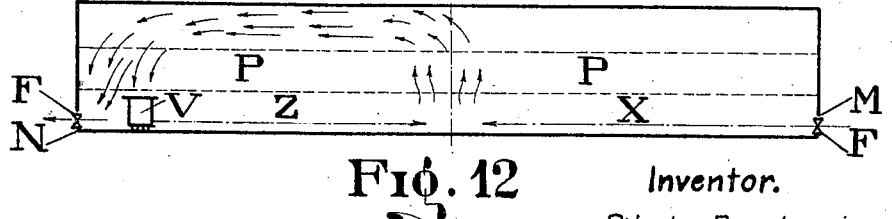

In the annexed drawings Figs. 7, 8 and 9 show the path of air streams in the room A when the device V is moving in section X of chamber A, and Figs. 10, 11 and 12 show the path of the air streams when the device V is moving in the section Z of the same room. In the three last figures the operation of the ventilating device V and fans F is reversed with regard to that assumed for Figs. 7, 8 and 9 and in any case said ventilating device V and either of the fans F produce horizontal air streams meeting each other.

Figs. 13 and 14 show a device adapted for use in connection with the above described plant. As shown in said figures said device comprises a casing 1 having bearings 2 in which are mounted axles 3 having wheels 4 which are adapted to run on track 5 and are driven by means of an electromotor 6 and a suitable gear 7.

The casing 1 is provided with partitions 1' forming side chambers 19—19' each having a top enlarged mouth 8 and opposite front mouths 9 and 10, and in each of these chambers is mounted a fan 20 operated by an electromotor 11. Within each chamber is mounted a baffle or movable partition 12 which is adapted to shut either of mouths 9 or 10, said baffles 12 being secured to a shaft 13 driven by the intermediary of pinions 14—15, operated by an arm 16 fixed to the pinion 14 and extending from the side of the casing to coöperate with a device arranged in the middle portion of one of the side walls of room A as hereinafter described.

In the construction shown by Fig. 15, instead of baffles 12, the mouths 9—10 are controlled by means of butterfly or similar valves 21 which are suitably operated by means of gears, levers, arms or the like.

The electric current may be fed to electromotors 6 and 11 by means of trolleys or similar members 18 sliding in contact with the wires 19ª arranged longitudinally in the room A.

A construction of the device for reversing the position of the baffles 12 is shown in detail by Figs. 23, 24 and 25.

Said device comprises an arm 27 located in a recess 28 of the wall of the room A and pivoted on a pin 29 carried by a plate 30 closing said recess. Said plate 30 is provided with an arch shaped slot 31 having its center at 29, the arm 27 carrying a pin 17 projecting through said slot 31 and having a roller 33 for engagement with the arm 16 of the traveling device V. Within the recess 28 are located two springs 34 each having one end secured to arm 27 and the opposite one secured to the wall of said recess.

When the arm 16 of the traveling device V strikes the roller 33 and the pin 17, the latter is moved with the arm 27 to a certain extent against the action of either of said springs 34 and then the arm 16 is rocked with pinion 14 so as to operate the baffle 12; after this operation the arm 16 releases the pin 17 and the arm 27 is restored by spring 34 to its intermediate position for engagement with arm 16 on the next stroke of the device V.

In operation, the ventilating device V is driven by electromotor 6, gear 7 and wheels 4 to reciprocate through sections Z and X of the room A, and the fans 20 are operated by their motors 11 to produce a suction from top to bottom and to drive an air stream through either the mouths 9 or the mouths 10 according to the position of baffles 12 which are reversed as described when the apparatus passes the middle of the room by shaft 13, gears 14—15 and arm 16 coöperating with pin 17.

This operation gives rise to a vertical downward air stream R and to either of horizontal streams S—S' as indicated by Fig. 16 and hereinbefore described in connection with Figs. 1—6.

The operation shown by Figs. 7—12 may be obtained by controlling the running of fans F mounted in ports M—N so as to drive into room A an air stream directed against that issuing from mouth 9 or 10. Thus said fans F operate to change the air within the room and they improve the ventilation; for instance, at the meeting point of the opposite air streams that is, the stream produced by the device V and the stream produced by either of fans F, there is provided a strong air stream from bottom to top; thereby increasing the quantity of air moving near the horizontal wall of the room and coming toward the suction mouths of the device V and the opposite ports of room A, the fans F at the other end of the room A operating to exhaust air therefrom.

Figure 17:
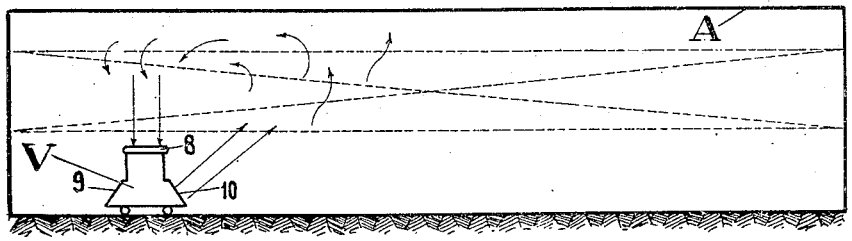
Figs. 17, 18 and 19 show the path of air streams obtained in the room by means of a modified construction of said ventilating device.
Figure 18:
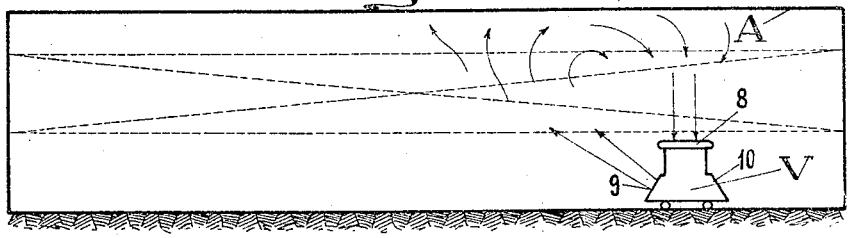
Figure 19:
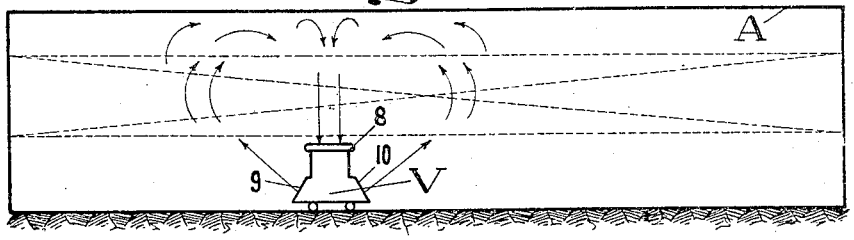
Figure 20:
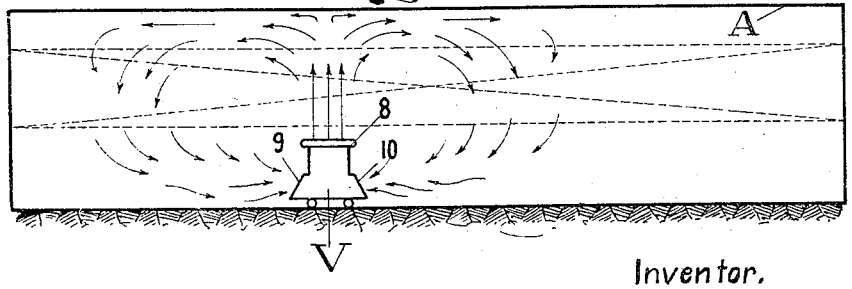
Fig. 20 shows the path of air streams obtained in the room by means of said modified construction of ventilating device arranged to operate in a different manner.

Figs. 17 and 18 show the operation of a modified construction of ventilating device V in which this device drives through either of its front mouths 9—10 an upwardly inclined air stream, the air thus propelled being drawn through the top mouth 8 so as to produce a vertical downward air current above said devices. Fig. 19 shows a similar operation of said device in which air is propelled through both front mouths 9 and 10 of the device, both streams thus produced collecting together and the air being drawn vertically into the device through the top mouth 8. Finally in the operation illustrated by Fig. 20 the air is propelled upwardly through the top mouth 8 and the said air is deflected by the top wall of the room so as to be drawn through the front mouths 9—10 of the device.

Figure 22:
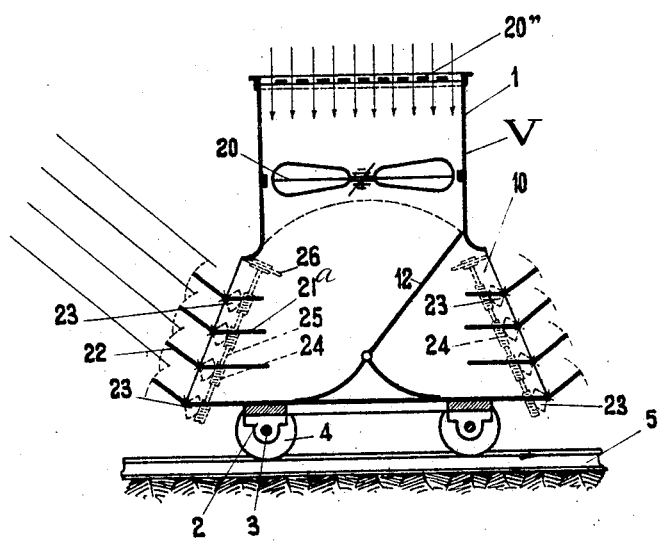
Fig. 22 is a longitudinal section of said modified construction of ventilating device.

Fig. 22 shows by way of example a construction of a device adapted to give rise to the operation illustrated by Figs. 17—18—19 and 20, this device being similar to that shown in Figs. 13—14 and 15 and being provided with means for giving rise to inclined air streams and for adjusting their inclination.

As shown in said figure, the device comprises a casing 1 having bearing 2 in which are mounted axles 3 having wheels 4. Said casing is provided at its top with one or more mouths 8, having spreading rods 20" for spreading the air flowing through them, as well as with front mouths 9 and 10. In said casing are mounted a propeller 20 and a baffle 12 for controlling the flow of air through said casing 1 as above described.

In months 9 and 10 are located horizontal stationary plates 21ª and at the outer edge of each of them is pivoted a movable extension or plate 22 fixed to a toothed quadrant 23; the several quadrants gear with screws 24 which are secured to a spindle 23 provided with a controlling hand wheel 26.

By operating the hand wheel 26 and spindle 25 the plates 22 are swung around their pivots and therefore they may be carried either in alinement with the associated stationary plates 21ª or at any required angle with regard to the same and therefore the direction or inclination of air streams flowing between said plates may be adjusted at will according to requirements.

The baffle 12 may be operated by the gear described in connection with Figs. 23—24—25 to cause the air to flow through either of mouths 9 or 10 for reversing the said air stream at the required time with regard to the reciprocation of the device in the room and thus to obtain the operation shown by Figs. 17 and 18; further, said baffle may be held in its intermediate position, the air being then propelled through both mouths 9 and 10 as shown by Fig. 19. Finally said baffle may be held in its intermediate position and the operation of propeller 11 may be reversed to obtain the operation shown by Fig. 20.

Figure 21:
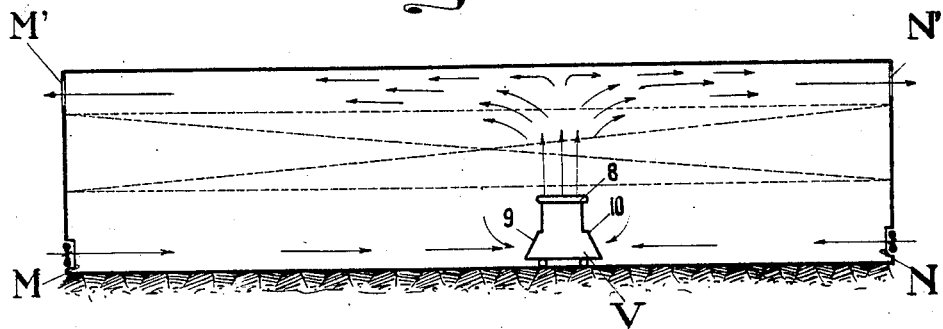
Fig. 21 shows the path of air streams obtained by means of said modified construction of ventilating device and coöperating inlet and exhaust ports provided in the walls of the room.

As shown by Fig. 21, the traveling ventilating device V may coöperate with inlet and exhaust ports M, N and M', N' feeding the air into the room and exhausting it therefrom, and therefore the same operation as described in connection with Figs. 7—12 may be obtained.

Further, the ventilating device need not be arranged to travel along a track located on the ground of the room, but other arrangements may be provided.

Fig. 26, which is a fragmentary enlarged section of the bottom portion of the ventilating device V, shows a construction of an arrangement for driving said device and reversing the direction of its run in the room.

Said arrangement comprises an electromotor 6 mounted on the floor 32 of the device V and whose shaft has a pinion 35 meshing with a pinion 36 driving a speed reducing gear of any kind shown as a whole by 37. The driven pinion 38 of this gear operates a pinion rotatably mounted on a stationary part 39 and comprising a bevel toothed rim 40 meshing with pinion 38, as well as a bevel toothed rim 41 meshing with pinions 42 and 43 which are loosely mounted on the shaft 3 of the wheels of the device. Said pinions 42 and 43 are thus driven in opposite directions and they are provided with means for engagement with a clutch sleeve 44 adapted to rotate with the shaft 3 but to be shifted along said shaft by a depending arm 45 pivoted on a stationary portion of the frame of the device and having a roller 46.

At suitable points on the floor of the room are located switches 47 each comprising a slope surface 48 intended to be engaged by roller 46 and to shift it with arm 45 and sleeve 44 when the ventilating device reaches the end of a stroke so as to release the clutch sleeve 44 from either of the pinions 42 and 43 and engage it with the other one for reversing the running of the ventilating device. Preferably said arm 35 or sleeve 44 is provided with a trip device holding it in engagement with either of said pinions until it is shifted by one of said switches.

A number of adjustable switches similar to 47 may be arranged along the path of the roller 46 in order to reverse the running of the ventilating device at any desired point of its travel for the purpose of limiting the travel of the ventilating device to any portion of the length of the room.

By the described constructions of the apparatus there may be obtained in the drying room, vertical air currents and air streams directed along the path of the device and longitudinally of the room, these streams being horizontal or inclined and issuing from or entering said device through a single one or both the front mouths of the same.

Obviously, the ventilating device may be provided with a single suction mouth or with a plurality of them, according to size of room A and circumstances; also the number of inlet and exhaust ports M and N may vary according to circumstances.

In connection with subject matter disclosed but not claimed herein attention is called to my copending applications Serial Nos. 352,263, filed January 19, 1920, 352,266, filed January 19, 1920 and 352,267, filed January 19, 1920, and my Patent No. 1,344,163 granted June 22, 1920.

What I claim as my invention and desire to secure by United States Letters Patent is:—

1. In a plant for drying materials, a room intended to contain the material to be dried; and means reciprocating in said room and adapted to produce vertical air currents and air streams directed along the path of said means, said streams giving rise to vertical currents which travel along said room in accordance with the motion of said means.

2. In a plant for drying materials, a room intended to contain the material to be dried; means reciprocating in said room, and adapted to produce vertical air currents and air streams directed along the path of said means; ports in the transverse walls of said room; and means for producing air streams through said ports, said streams coöperating to give rise to vertical air currents which travel along said room in accordance with the motion of said reciprocating means.

3. In a plant for drying materials, a room intended to contain the material to be dried; and means reciprocating in said room and adapted to produce vertical air currents and inclined air streams directed along the path of said means, said streams giving rise to vertical currents which travel along said room in accordance with the motion of said means.

4. In a plant for drying materials, a room intended to contain the material to be dried; means reciprocating in said room and adapted to produce vertical air currents and inclined air streams directed along the path of said means; ports in the transverse walls of said room; and means for producing air streams through said ports, said streams coöperating to give rise to vertical air currents which travel along said room in accordance with the motion of said reciprocating means.

5. In a plant for drying materials, a room intended to contain the material to be dried; and means reciprocating in said room and adapted to produce a vertical downward suction and air streams directed along the path of said means, said suction and streams coöperating to give rise to vertical air currents which travel along said room in accordance with the motion of said means.

6. In a plant for drying materials, a room intended to contain the material to be dried; means reciprocating in said room and adapted to produce a vertical downward suction and air streams directed along the path of said means; ports in the end walls of said room; and means for producing air streams through said ports, said suction and streams coöperating to give rise to vertical air currents which travel along said room in accordance with the motion of said reciprocating means.

7. In a plant for drying materials, a room intended to contain the material to be dried; and means reciprocating in said room and adapted to produce a vertical downward suction and inclined air streams directed along the path of said means, said suction and streams coöperating to give rise to vertical air currents which travel along said room in accordance with the motion of said means.

8. In a plant for drying materials, a room intended to contain the material to be dried;

means reciprocating in said room and adapted to produce a vertical downward suction and inclined air streams directed along the path of said means; ports in the end walls of said room; and means to produce air streams through said ports, said suction and streams coöperating to give rise to vertical air currents which travel along said room in accordance with the motion of said reciprocating means.

9. In a plant for drying materials, a room intended to contain the material to be dried; means reciprocating in said room and adapted to produce a vertical air current and air streams directed along the path of said means; and means for reversing the direction of said air streams to drive them in one direction when said reciprocating means travel in one section of said room and in the opposite one when said reciprocating means travel in the other section of said room, said current and streams coöperating to give rise to vertical air currents which travel along said room in accordance with the motion of said reciprocating means.

10. In a plant for drying materials, a room intended to contain the material to be dried; means reciprocating in said room and adapted to produce a vertical air current and longitudinal air streams directed along the path of said means; means for reversing the direction of said longitudinal air streams to drive them in one direction when said reciprocating means travel in one section of said room and in the opposite one when said reciprocating means travel in the other section of said room; ports in the end walls of said room; means for producing air streams through said ports which are operated to drive air streams against said longitudinal air streams; and means for reversing the operation of said driving means when the direction of said longitudinal air streams is reversed, said currents and streams coöperating to give rise to vertical air currents which travel along said room in accordance with the motion of said reciprocating means.

11. In a plant for drying materials, a room intended to contain the material to be dried; means reciprocating in said room and adapted to produce an upward air current and air streams directed along the path of said means, said current and streams coöperating to give rise to vertical air currents which travel along said room in accordance with the motion of said means.

12. In a plant for drying materials, a room intended to contain the material to be dried; means reciprocating in said room and adapted to produce an upward air current and air streams directed along the path of said means; ports in the end walls of said room; and means for producing air streams through said ports, said current and streams coöperating to give rise to vertical air currents which travel along said room in accordance with the motion of said reciprocating means.

13. In a plant for drying materials, a room intended to contain the material to be dried; a casing adapted to reciprocate in said room and having top and front mouths; means for operating said casing; means for propelling air through said top and front mouths; and means for controlling the air flow through said front mouths.

14. In a plant for drying materials, a room intended to contain the material to be dried; a casing adapted to reciprocate in said room and having top and front mouths; means for operating said casing; means for propelling air through said top and front mouths; means for controlling the air flow through said mouths; and means at said front mouths for imparting the required direction to the air streams flowing therethrough.

15. In a plant for drying materials, a room intended to contain the material to be dried; a casing adapted to reciprocate in said room and having top and front mouths; means for operating said casing; means for propelling air through said top and front mouths; means for controlling the air flow through said mouths; and adjustable means at said front mouths for modifying the direction of the air streams flowing through them.

16. In a plant for drying materials, a room intended to contain the material to be dried; a casing adapted to reciprocate in said room and having top and front mouths; means for operating said casing; means for propelling air through said top and front mouths; means for controlling the air flow through said mouths; horizontal stationary plates intersecting said front mouths; movable plates each pivoted adjacent the edge of one of said stationary plates; toothed quadrants fixed to said movable plates; screws meshing with said quadrants; spindles fixed to said screws; and means for operating said spindles for imparting the required direction to the air streams flowing through said mouths.

17. In a plant for drying materials, a room intended to contain the material to be dried; a casing adapted to reciprocate in said room and having top and front mouths; means for operating said casing; means in said casing for producing air streams through said top and front mouths; means in said casing for shutting either of said front mouths; means controlling said shutting means; and means at substantially the middle of the room coöperating with said controlling means to shut either of said mouths and cause the air flowing through them to be driven into one section of the room when the casing travels in the other section, said air streams giving rise to vertical air currents which travel along said room in accordance with the motion of said casing.

18. In a plant for drying materials, a room intended to contain the material to be dried; a casing adapted to reciprocate in said room and having top and front mouths; means for operating said casing; means in said casing for producing air streams through said top and front mouths; means in said casing for shutting either of said front mouths; means for controlling said shutting means; means at substantially the middle of the room coöperating with said controlling means to shut either of said front mouths and cause the air flowing through them to be driven into one section of the room when the casing travels in the other section; ports in the end walls of said room; and means for producing air streams through said ports, said producing means being operated to drive air streams into said room against the air streams produced by said casing and coöperating means, said streams coöperating to give rise to vertical air currents which travel along said room in accordance with the motion of said casing.

19. In a plant for drying materials, a room intended to contain the material to be dried; a casing adapted to reciprocate in said room and having top and front mouths; means for operating said casing; means in said casing for producing air streams through said top and front mouths; means at said front mouths for imparting the required direction to the air streams flowing through said mouths; means in said casing for shutting either of said front mouths; means controlling said shutting means; and means at substantially the middle of the room coöperating with said controlling means to shut either of said mouths and cause the air flowing through them to be driven into one section of the room when the casing travels in the other section, said air streams giving rise to vertical air currents which travel along said room in accordance with the motion of said casing.

20. In a plant for drying materials, a room intended to contain the material to be dried; a casing adapted to reciprocate in said room and having top and front mouths; means for operating said casing; means in said casing for producing air streams through said top and front mouths; means at said front mouths for imparting the required direction to the air streams flowing through them; means in said casing for shutting either of said front mouths; means controlling said shutting means; means at substantially the middle of the room coöperating with said controlling means to shut either of said front mouths and cause the air flowing through them to be driven into one section of the room when the casing travels in the other section; ports in the end walls of said room; and means for producing air streams through said ports, said means being operated to drive air streams into said room against the streams produced by said casing and coöperating means, said streams coöperating to give rise to vertical air currents which travel along said rooms in accordance with the motion of said casing.

Signed at Naples, Italy, this 18 day of July A. D. 1919.

PILADE BARDUCCI.